(12) United States Patent  
Culp

(10) Patent No.: US 8,963,485 B2
(45) Date of Patent: Feb. 24, 2015

(54) BATTERY CHARGER SYSTEM AND METHOD

(71) Applicant: Norman L. Culp, Montgomery, TX (US)

(72) Inventor: Norman L. Culp, Montgomery, TX (US)

( * ) Notice: Subject to any disclaimer, the term of this patent is extended or adjusted under 35 U.S.C. 154(b) by 166 days.

(21) Appl. No.: 13/653,244

(22) Filed: Oct. 16, 2012

(65) Prior Publication Data

US 2014/0042959 A1     Feb. 13, 2014

Related U.S. Application Data

(60) Provisional application No. 61/680,946, filed on Aug. 8, 2012.

(51) Int. Cl.
*H02J 7/00* (2006.01)
(52) U.S. Cl.
USPC .......................................... 320/107; 320/137
(58) Field of Classification Search
USPC ........................................................ 320/107
See application file for complete search history.

(56) References Cited

U.S. PATENT DOCUMENTS

| | | | |
|---|---|---|---|
| 4,052,656 A | 10/1977 | Lavell et al. | |
| 5,179,335 A | 1/1993 | Nor | |
| 5,180,961 A | 1/1993 | Tsujino | |
| 5,621,299 A | 4/1997 | Krall | |
| 5,670,862 A | 9/1997 | Lewyn | |
| 6,002,237 A | 12/1999 | Gaza | |
| 6,172,481 B1 | 1/2001 | Curtiss | |
| 6,201,370 B1 | 3/2001 | Reller et al. | |
| 7,212,006 B2 | 5/2007 | Huang | |
| 7,626,362 B2 | 12/2009 | Guang et al. | |
| 7,898,220 B2 | 3/2011 | Guang et al. | |
| 2001/0006338 A1* | 7/2001 | Yamashita | 320/160 |
| 2002/0079865 A1 | 6/2002 | Thomas et al. | |
| 2005/0258805 A1 | 11/2005 | Thomas et al. | |
| 2005/0264262 A1 | 12/2005 | Kang et al. | |
| 2007/0188135 A1* | 8/2007 | Odaohhara | 320/114 |
| 2008/0007213 A1 | 1/2008 | Huang et al. | |
| 2008/0024090 A1 | 1/2008 | Guang et al. | |
| 2008/0191666 A1* | 8/2008 | Kernahan et al. | 320/150 |
| 2008/0231238 A1 | 9/2008 | Wong et al. | |
| 2008/0252264 A1 | 10/2008 | Chen | |
| 2009/0009134 A1 | 1/2009 | Wong et al. | |

OTHER PUBLICATIONS

International Search Report, PCT/US2013/054165, Jan. 30, 2014.
(Continued)

*Primary Examiner* — Arun Williams
(74) *Attorney, Agent, or Firm* — Kevin M. Klughart; David W. Carstens; Carstens & Cahoon, LLP

(57) ABSTRACT

A battery charger system and method are disclosed for increasing a charge of a battery. In one embodiment of the battery charger, an input for an electric charging power source is configured to supply electrical charging power to a rechargeable battery via an output circuit portion interposed therebetween. A transfer function circuit portion is configured to sense the voltage of the rechargeable battery as a sensing voltage such that the change in the sensing voltage is directly proportional to the internal impedance of the rechargeable battery. A control logic circuit portion is configured to select between: a constant current, variable voltage operational mode; a constant current, scalable voltage operational mode; and a variable current, constant voltage operational mode to furnish rapid recharging of the rechargeable battery.

10 Claims, 15 Drawing Sheets

(56) References Cited

OTHER PUBLICATIONS

Chia-Hsiang Lin, Chi-Lin Chen, Yu-Huei Lee, Shih-Jung Wang, Hong-Wei Huang, and Ke-Horng Chen, Fast Charging Technique for Li-Ion Battery Charger, 978-1-4244-2182-4/08/$25.00 © 2008 IEEE. pp. 618-621.

* cited by examiner

BATTERY CHARGER SYSTEM AND METHOD

PRIORITY STATEMENT & CROSS-REFERENCE TO RELATED APPLICATIONS

This application claims priority from U.S. Patent Application No. 61/680,946, entitled "Battery Charger and System and Method for Use of Same" and filed on Aug. 8, 2012, in the name of Norman L. Culp; which is hereby incorporated by reference for all purposes.

TECHNICAL FIELD OF THE INVENTION

This invention relates, in general, to battery or cell charging devices and, in particular, to a battery charger and a system and method for use of the same that rapidly recharges a battery.

BACKGROUND OF THE INVENTION

A common method for charging batteries is to charge with a constant current until the battery terminal voltage reaches the reference voltage and then continue charging while maintaining the battery terminal voltage at a constant voltage. As shown in prior art FIGS. 1 and 2, while charging with the constant voltage, the charging current decreases to a minimum value at which point the charging will be terminated. The decrease in the charging current is due to the internal battery impedance. As the internal battery voltage increases, the voltage across the internal battery impedance decreases due to the decrease in charging current until the current reaches a preset value, after which charging terminates. Therefore, charging in the constant voltage mode increases the charging time due to the lower charging current. Accordingly, a need exists for charging techniques which decrease battery recharging time.

SUMMARY OF THE INVENTION

It would be advantageous to achieve a battery charging system that would enable a battery to be fully charged using a constant current, thereby minimizing the time the battery would be charged. It would also be desirable to enable an electrically engineered solution that would address this problem by measuring internal battery resistance indirectly. To better address one or more of these concerns, a battery charger and a system and method for use of the same are disclosed that rapidly recharge a battery. In one embodiment of the battery charger, an input for an electric charging power source is configured to supply electrical charging power to a rechargeable battery via an output circuit portion interposed therebetween.

A transfer function circuit portion is configured to sense the voltage of the rechargeable battery as a sensing voltage such that the change in the sensing voltage is directly proportional to the internal impedance of the rechargeable battery. A control logic circuit portion is configured to select between a constant current, variable voltage operational mode, a constant current, scalable voltage operational mode, and a variable current, constant voltage operational mode to furnish rapid recharging of the rechargeable battery. In one implementation, the control logic circuit portion is configured to select between a constant current, variable voltage operational mode and a constant current, scalable voltage operational mode. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 3:
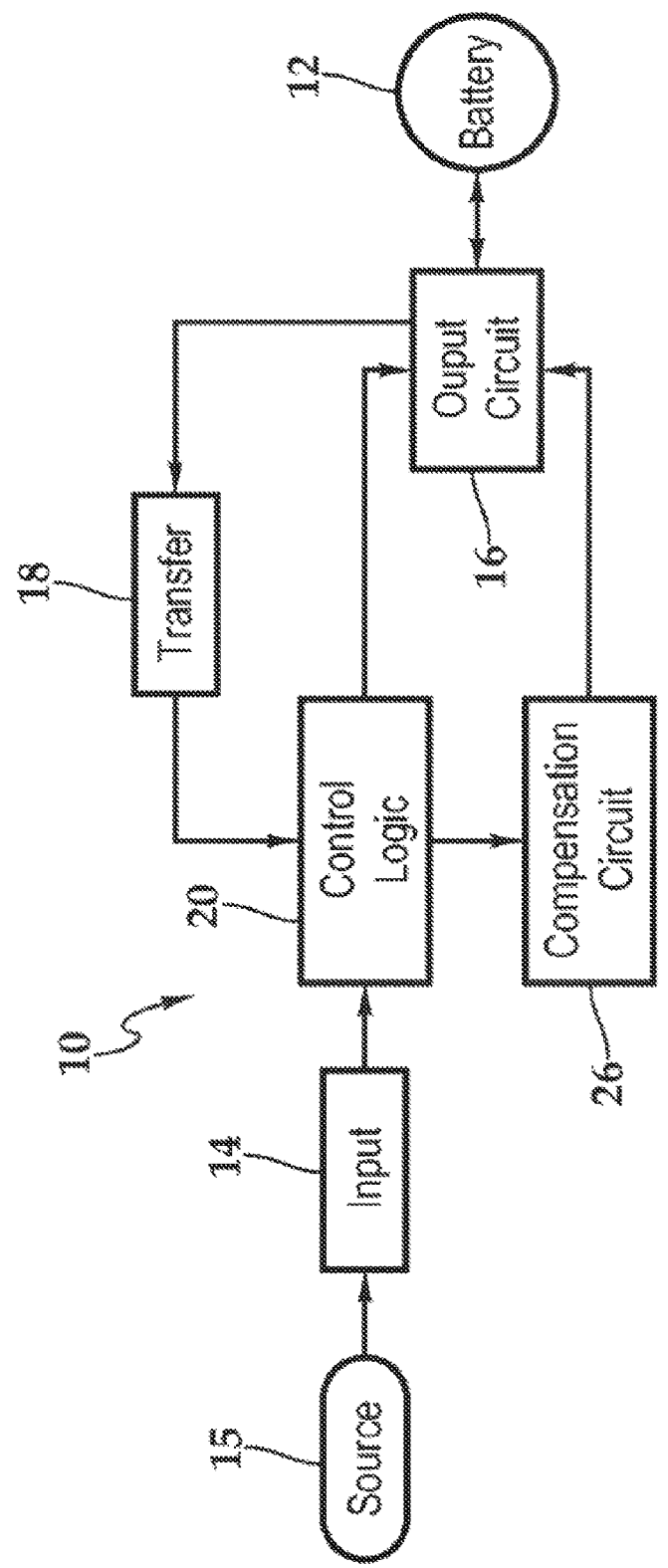
FIG. 3 is a schematic block diagram of one embodiment of a battery charger according to the teachings presented herein.

Referring now to FIG. 3, therein is depicted a battery recharger 10 for increasing a charge of a rechargeable battery 12. An input 14 for an electric charging power source is configured to supply electrical charging power to the rechargeable battery 12 via an output circuit portion 16 interposed therebetween. As will be described in further detail below, the output circuit portion 16 includes a predetermined reference voltage (VREF) associated therewith. A transfer function circuit portion 18 is configured to sense the voltage (VB) of the rechargeable battery 12 as a sensing voltage (VSNS), wherein the change in the sensing voltage (ΔVSNS) is directly proportional to the internal impedance of the rechargeable battery 12.

A control logic circuit portion 20 includes first and second amplifier circuit portions defining respective current loop circuit 22 and voltage loop circuit 24 as well as a comparator.

The control logic circuit portion is configured to select between a constant current, variable voltage operational mode, a constant current, scalable voltage operational mode, and a variable current, constant voltage operational mode. In the constant current, variable voltage operational mode, the output circuit portion 16 is driven to provide a constant current, variable voltage electrical charging power to the rechargeable battery 12 until the sensing voltage (VSNS) is equal to the predetermined reference voltage (VREF). It should be appreciated, as will be discussed in further detail hereinbelow, that the constant voltage, variable current operational mode may be excluded.

In the constant current, scalable voltage operational mode, the output circuit portion 16 is driven to provide a constant current, scalable electric charging power to the rechargeable battery 12 in response to the sensing voltage (VSNS) exceeding the predetermined reference voltage (VREF), wherein the scalable voltage is scaled to the change in the sensing voltage (ΔVSNS). Lastly, in the variable current, constant voltage operational mode, the output circuit portion 16 is driven to provide a variable current, constant voltage electric charging power to the rechargeable battery 12 in response to the sensing voltage exceeding a comparison voltage (VCOMP).

A compensation circuit portion 26 is disposed between the control logic circuit portion and the output circuit portion in order to generate the change in the sensing voltage thereacross in the constant current, scalable voltage operational mode. The compensation circuit portion may be a variable resistor initially set to 0Ω.

Figure 4:
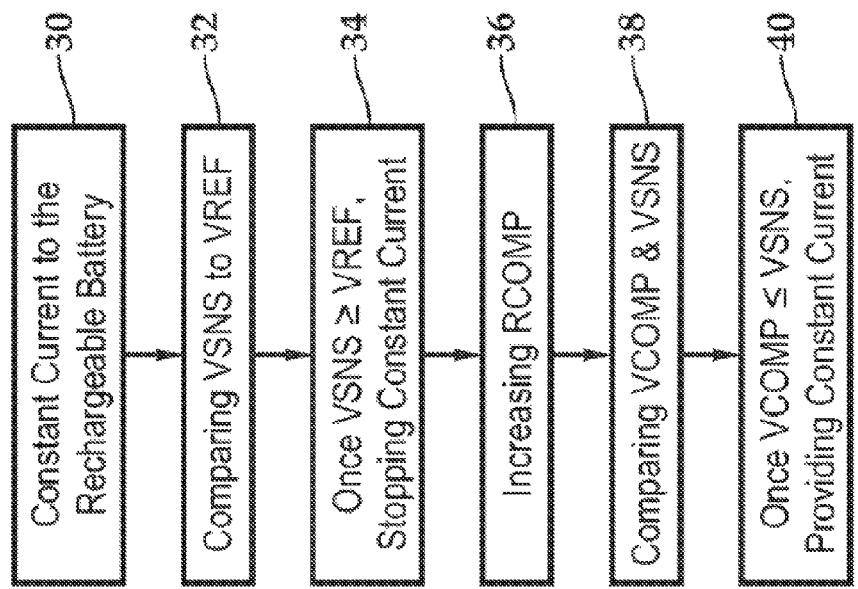
FIG. 4 is a flow chart of one embodiment of a method for charging a rechargeable battery with the battery charger according to the teachings presented herein.

Referring to FIG. 4, in an operational methodology, a method for charging the rechargeable battery with the battery charger includes at block 30 providing a constant current to the rechargeable battery to initiate a charge cycle in a constant current mode with a variable resister set to an initial value, which may be 0Ω.

At block 32, a comparator compares a sensing voltage (VSNS) to a reference voltage (VREF) and at block 34 the constant current to the rechargeable battery is stopped when the sensing voltage (VSNS) is greater than or equal to the reference voltage (VREF). The stopping action causes the sensing voltage (VSNS) to drop proportionally to the internal impedance of the rechargeable battery. This stopping action is the first stopping of the current after the initiation of the charge cycle. At block 36, the value (RCOMP) of the variable resistor is increased after the stopping in a scalable manner relative to the change in the sensing voltage (ΔVSNS). At block 38, the comparator compares a comparison voltage (VCOMP) to the sensing voltage (VSNS). At block 40, the constant current is provided to the rechargeable battery upon the comparison voltage (VCOMP) being less than or equal to the sensing voltage (VSNS), thereby stopping the increase in value (RCOMP) of the variable resistor.

In one embodiment, the methodology continues by the comparator comparing the sensing voltage (VSNS) to the reference voltage (VREF). The sensing voltage includes a second voltage drop across the variable resister and the second drop is proportional to the internal impedance of the rechargeable battery. In this embodiment, the methodology concludes with switching to a constant voltage mode when the sensing voltage (VSNS) is greater than or equal to the reference voltage (VREF).

Figure 5A:
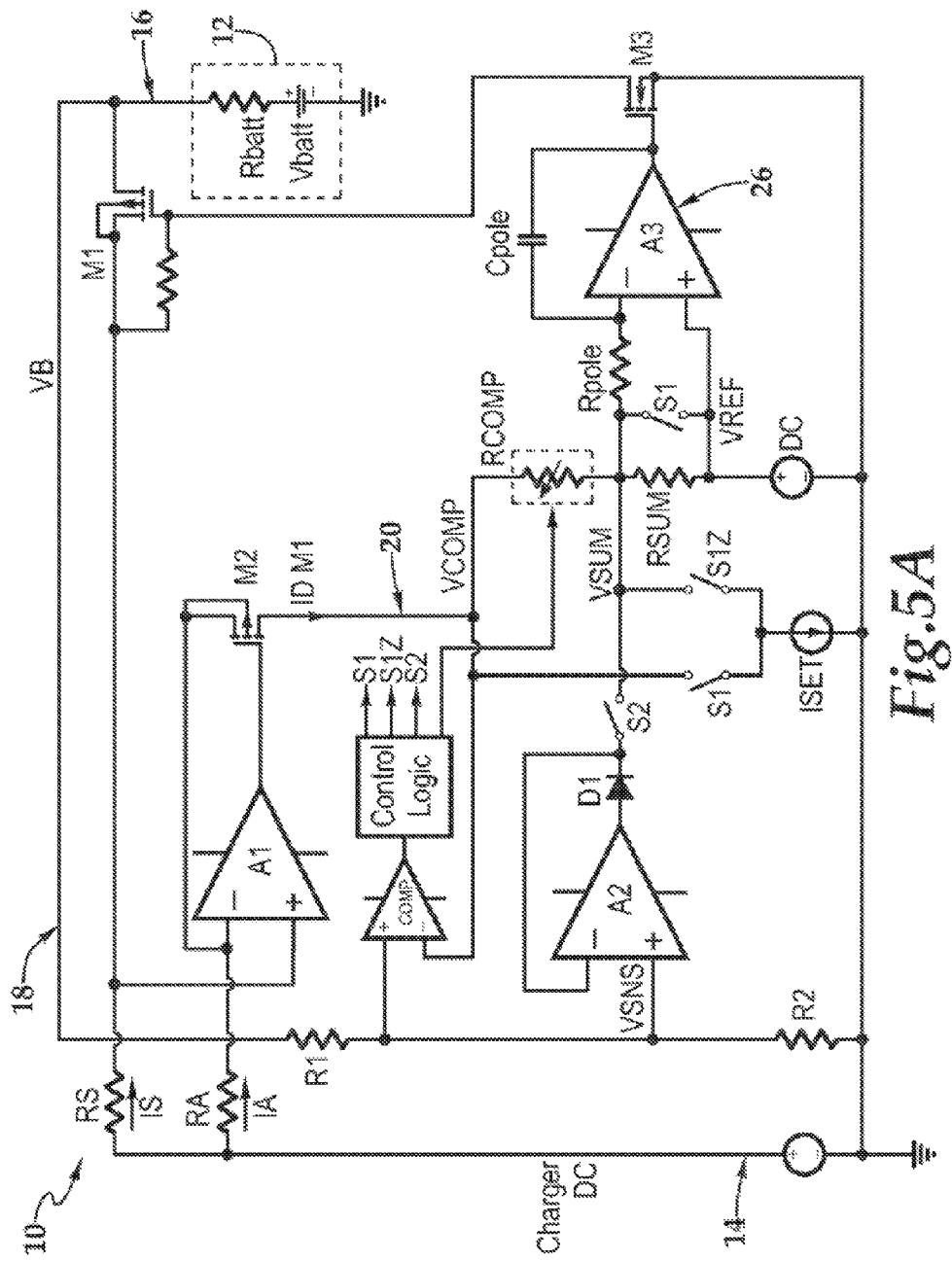
FIG. 5A is a schematic representative drawing of one implementation of the battery charger depicted in FIG. 3.
Figure 5B:
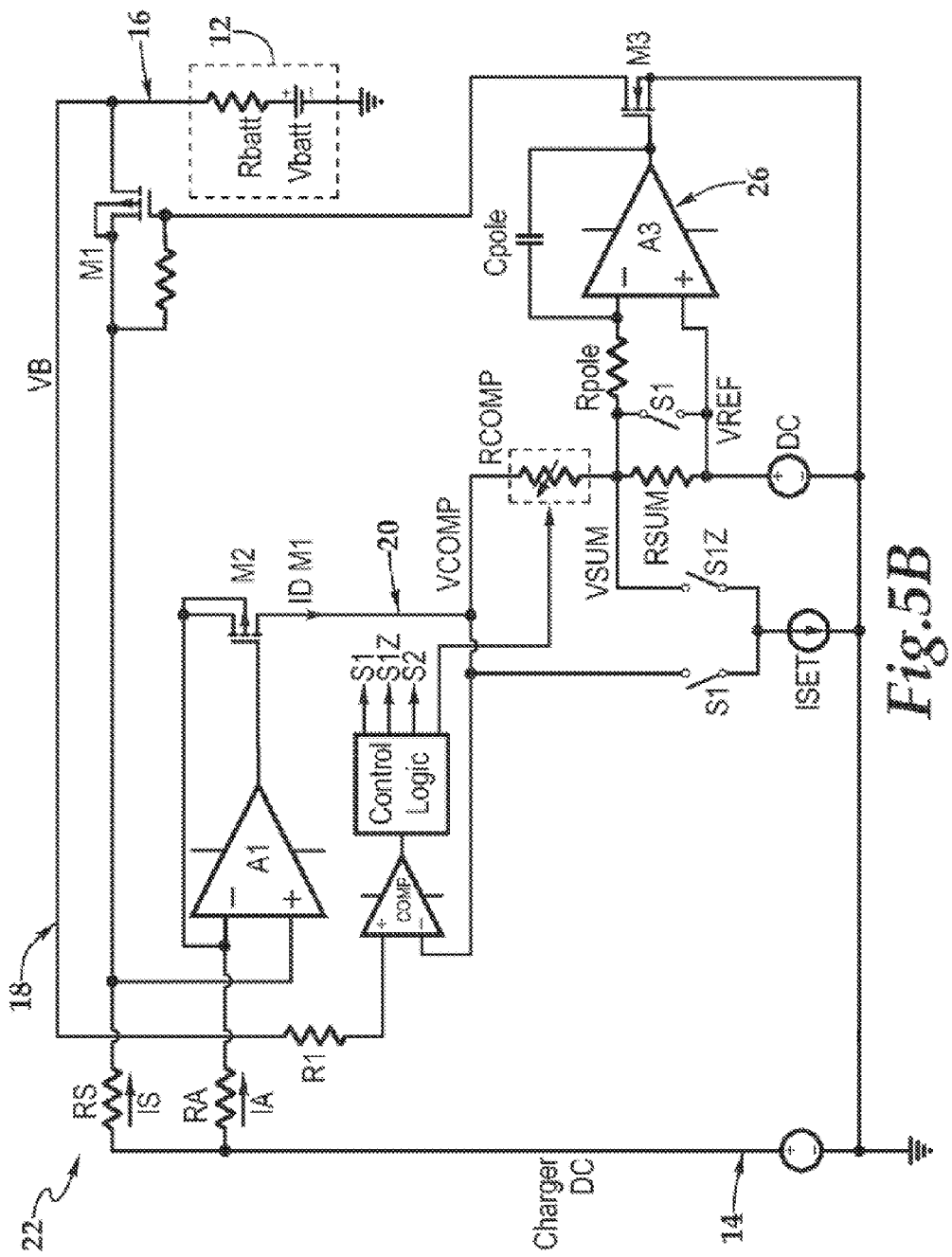
FIG. 5B is a schematic representative drawing of one implementation of the battery charger depicted in FIG. 5, wherein a current loop circuit operational embodiment is depicted.
Figure 5C:
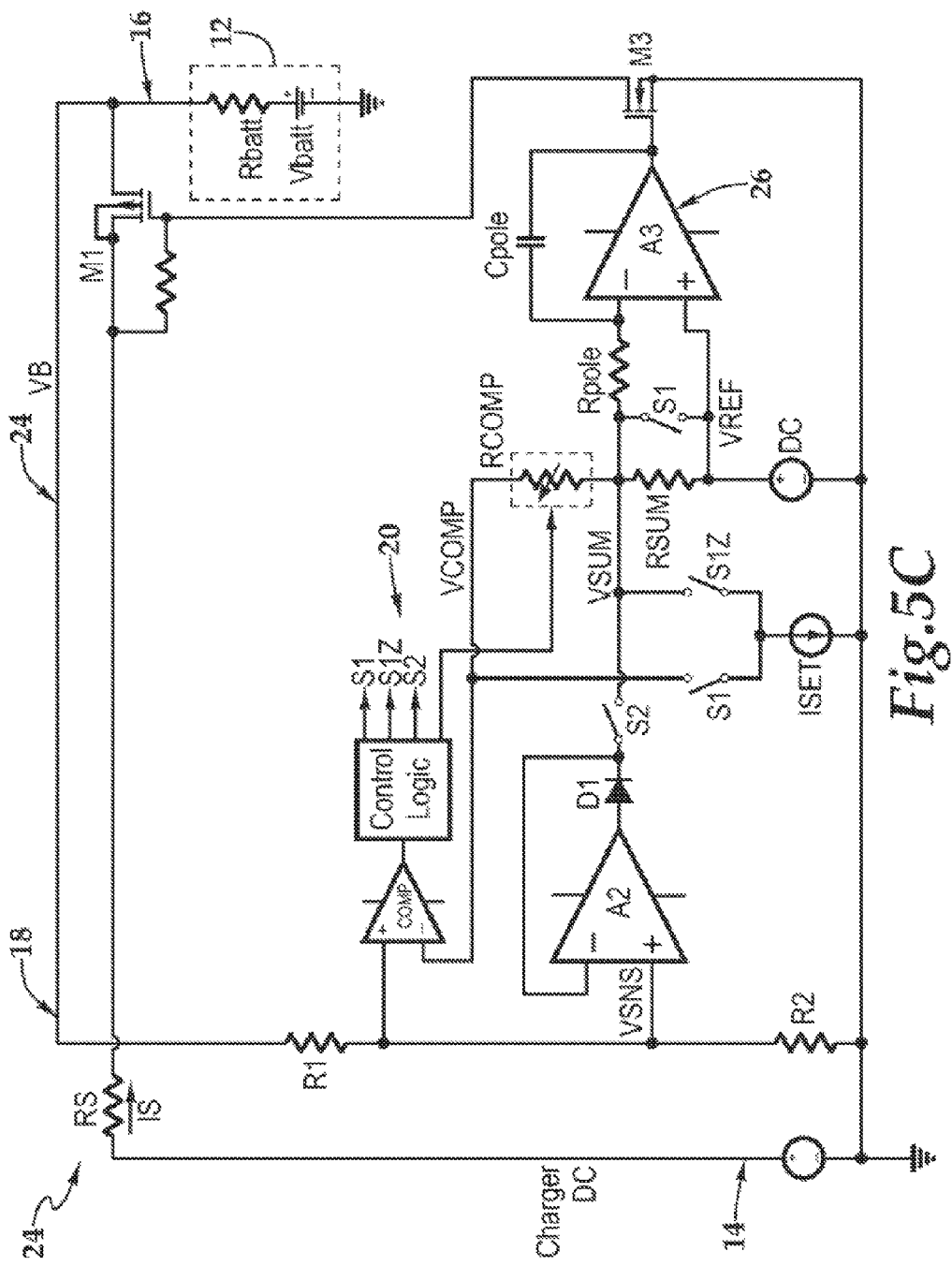
FIG. 5C is a schematic representative drawing of one implementation of the battery charger depicted in FIG. 5, wherein a voltage loop circuit operational embodiment is depicted.

Referring now to FIGS. 5A through 5C, wherein one implementation of the battery charger 10 depicted in FIG. 3 is shown in additional detail. Prior to discussing the start of the charge cycle, the current loop circuit 22 (e.g., operational embodiment in FIG. 5B) and the voltage loop circuit 24 (e.g., operational embodiment in FIG. 5C) will be discussed in general terms. For the battery 12 to be fully recharged, the voltage at VSNS would equal the voltage of VREF (e.g., 1.8V). If the battery 12 is not fully charged at the start of the charge cycle, then the voltage at VSNS is less than VREF and the output of the amplifier A1 is high, causing M2 to be turned OFF. To initiate current to flow to the current sink in the current loop circuit 22, which is depicted in FIG. 5B with the voltage loop circuit 22 removed for purposes of explanation, ISUM will pull the voltage at node VSUM low through RSUM causing amplifier A3 to turn transistors M3 and M1 ON. The current will increase until the current from IA is equal to ISET. The charging current is determined by amplifier A1 increasing the current, IA, until the voltage across resistor RA is equal to the voltage across resistor RS such that the following equations apply:

$$IS = (IA*RA)/RS \qquad \text{Equation \{1\}}$$

$$IA = (IS*RS)/RA \qquad \text{Equation \{2\}}$$

It follows from Equation {1} that if ISET=20 μA, RA=1KΩ, RS=0.01Ω, then IS=(20 μA*1KΩ)/(0.01Ω)=2 A.

Figure 1:
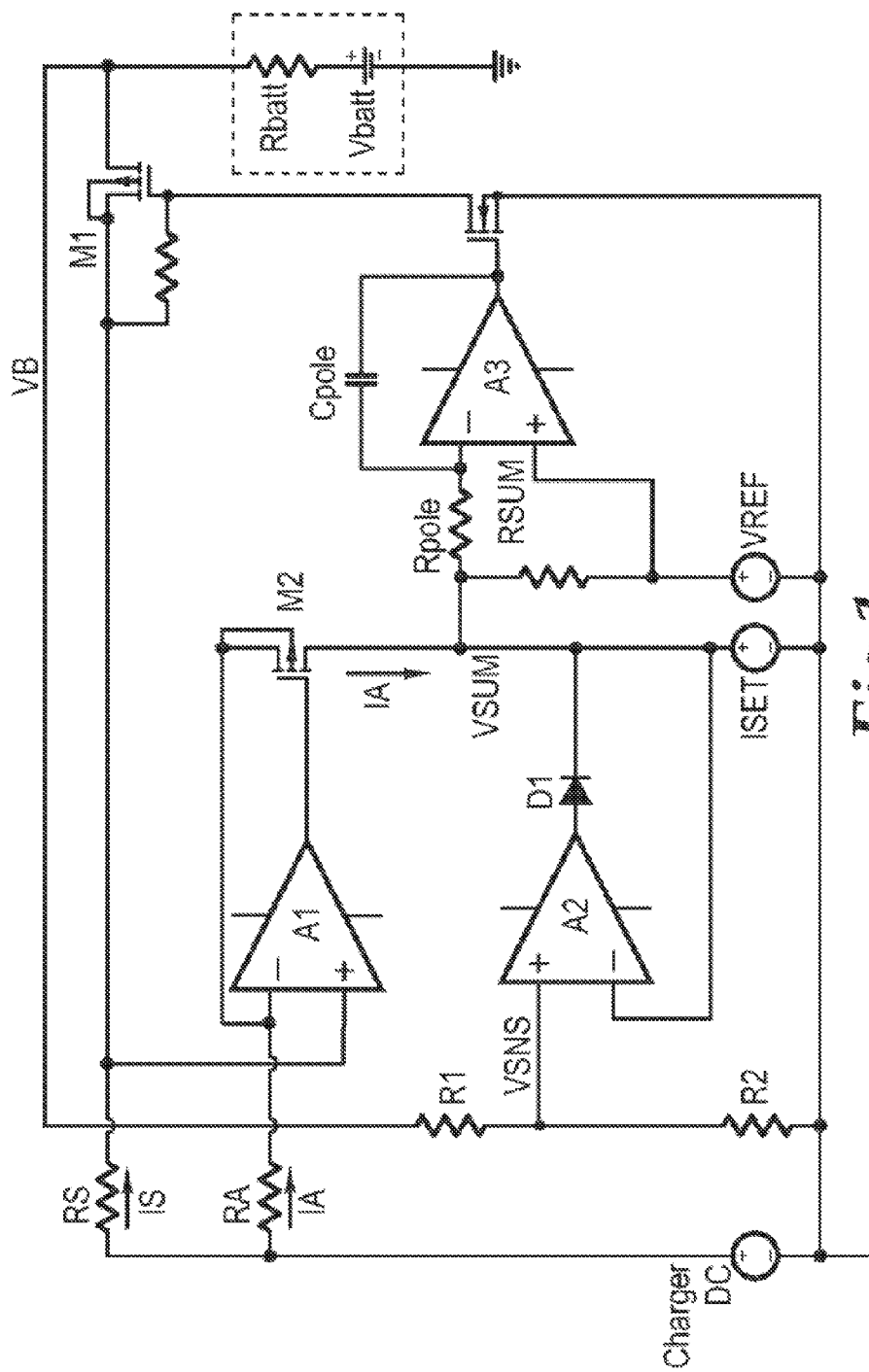
FIG. 1 is a schematic representative drawing of a prior art battery charger.
Figure 2:
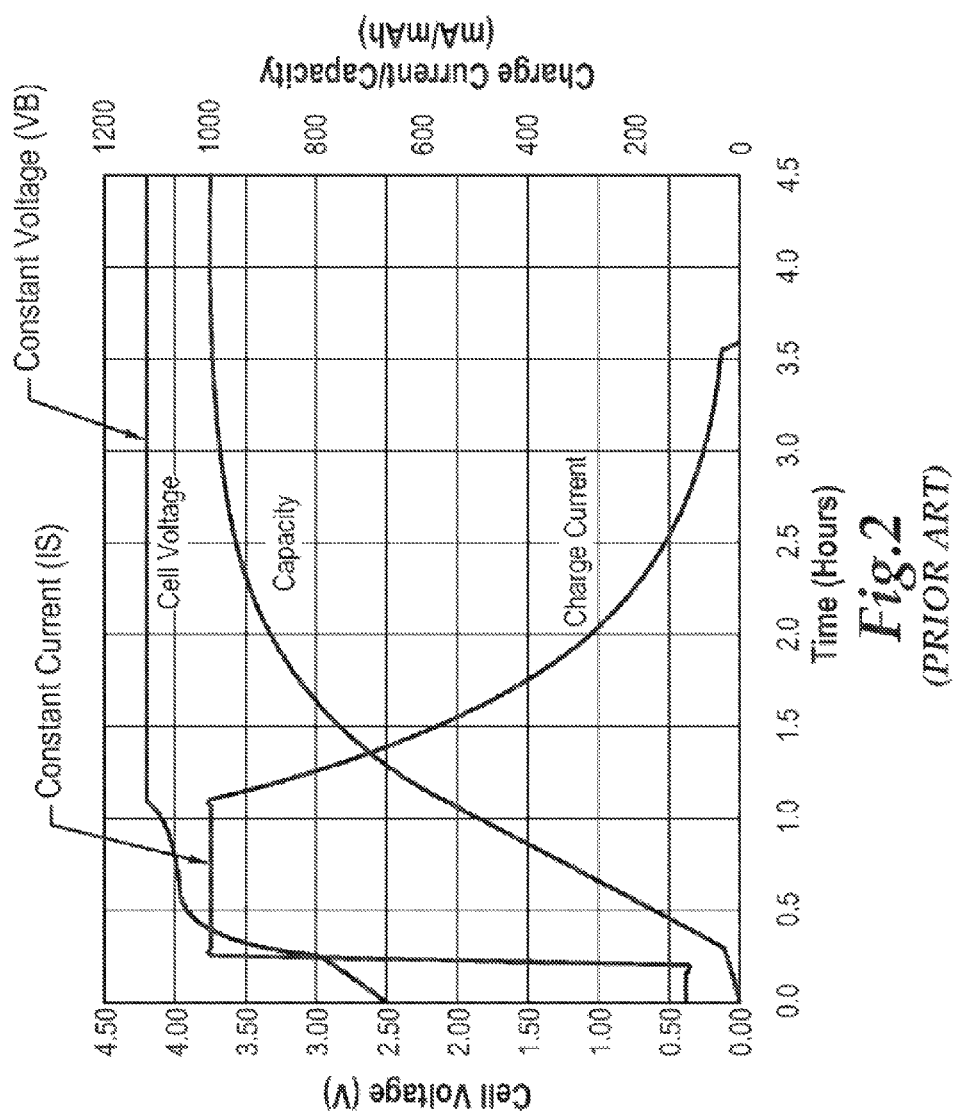
FIG. 2 is a graph of cell voltage (V) versus time (hours) depicting performance of the prior art battery charger illustrated in FIG. 1.

With respect to the voltage loop circuit 24, which is depicted in FIG. 5C with the current loop circuit 22 removed for purposes of explanation, as the battery voltage reaches the desired final voltage (VREF) and the voltage at the VSNS node is equal to, or slightly greater than VREF, the amplifier A2 will force node voltage VSUM to be slightly above the VREF voltage thereby forcing amplifier A3 to cause the transistor M1 to decrease the current to the battery 12. The amplifier A2 will keep the voltage at the VB mode equal to the desired battery final voltage while the current supplied by transistor M1 to the battery will continue to decrease. Although the voltage at VB is constant, the battery (VBATT) continues to increase while the charge current decreases and the IS*RBATT voltage drop, which results in a constant voltage profile shown in FIG. 1, unless the teachings presented herein are applied, wherein the battery resistance (RBATT) is compensated for with resistor RCOMP so that the battery is charged in the constant current mode until the internal battery cell voltage reaches the desired final voltage, thereby significantly reducing the time in the voltage mode or eliminating completely.

Returning to a discussion of the start of the charge cycle, the switches are set with S1 open, S1Z closed, and S2 open as S1Z is the compliment of S1 such that when S1 is closed, S1Z is open. The charge cycle initiates in the constant current mode with RCOMP set to 0Ω and remains in this mode until the voltage at VSNS is equal to VREF. Continuing with the start of the charge cycle, R1 and R2 are set as follows:

$$VSNS = (VB*R2)/(R1+R2) \qquad \text{Equation \{3\}}$$

When VSNS is slightly greater than VREF, the comparator COMP signals the control logic to close switch S1 and open switch S1Z, thereby beginning to increase RCOMP. As a result, current ceases to flow to the battery as transistor M1 and M2 turn OFF and VB decreases by the voltage across RBATT due to the absence of charging current. ISET now flows from VREF through RCOMP causing a voltage drop across RCOMP, which increases until VCOMP is equal to or less than the voltage at VSNS causing the output of the comparator COMP to go high. The control logic then causes RCOMP to stop increasing, thereby switch S1 opens and switch S2 closes. The battery charger 10 then returns to a constant current mode of operation and the battery is continued to be charged until VSNS is equal to or slightly greater than VCOMP, which causes the output of the comparator COMP to go high. As a result, the control logic closes switch S2, thereby placing the battery charger 10 in the constant voltage mode.

The transfer function for deriving the value of RCOMP is $K=R2/(R1+R2)$ when the charger is operating in the current mode and RCOMP=0Ω.

$$VB=(IS*RBATT)+VBATT \qquad \text{Equation }\{4\}$$

As the voltage VB approaches the desired battery voltage, the voltage at VSNS is:

$$VSNS=K*VB \qquad \text{Equation }\{5\}$$

$$VSNS=K(IS*RBATT+VBATT) \qquad \text{Equation }\{6\}$$

Now if IS=0, then from Equation {4}:

$$VSNS=K*VBATT, \qquad \text{Equation }\{7\}$$

so the difference in VSNS is Equation {7} minus Equation {6} or $$\Delta VSNS=K*VBATT-K(IS*RBATT+VBATT)=-K(IS*RBATT)$$

The needed generation of ΔVSNS across RCOMP may be accomplished in a similar manner by increasing the value of RCOMP with ISET flowing through it until the voltage across RCOMP is ΔVSNS. Once the value of RCOMP has been determined the battery charger continues charging the battery in the constant current mode and the voltage, based on Equation {1}, is as follows:

$$IA=(IB*RS)/RA \qquad \text{Equation }\{8\}$$

The final battery voltage VB is as follows:

$$VB=K*VREF \qquad \text{Equation }\{9\}$$

The current IA is now flowing through RCOMP. The comparator COMP output goes high when the following is satisfied:

$$VSNS=>VCOMP \qquad \text{Equation }\{10\}$$

$$VCOMP=VREF+IA*RCOMP \qquad \text{Equation }\{11\}$$

$$VSNS=K(IS*RBATT+VB) \qquad \text{Equation }\{12\}$$

Equating Equation {11} and Equation {12} provides the following:

$$VREF+IA*RCOMP=K(IS*RBATT+VB), \qquad \text{Equation }\{13\}$$

wherein IS=IA=0 in Equation {13} and therefore VREF=K*VB

It follows that the battery charger is charging the battery to the desired final voltage in the constant current mode, which reduces the time required to charge the battery. In this manner a system and method are presented to create a voltage which is scaled to ΔVSNS, which is directly proportional to RBATT. In this exemplary embodiment, ΔVSNS was created by using a resistor and a current ISET to drive the voltage. Accordingly, compensation for battery resistance RBATT is achieved for each individual battery on a batter-by-battery basis. If the battery resistance changes during the charging cycle, compensation may be achieved by periodically initializing the RCOMP setting procedure discussed hereinabove.

Figure 6:
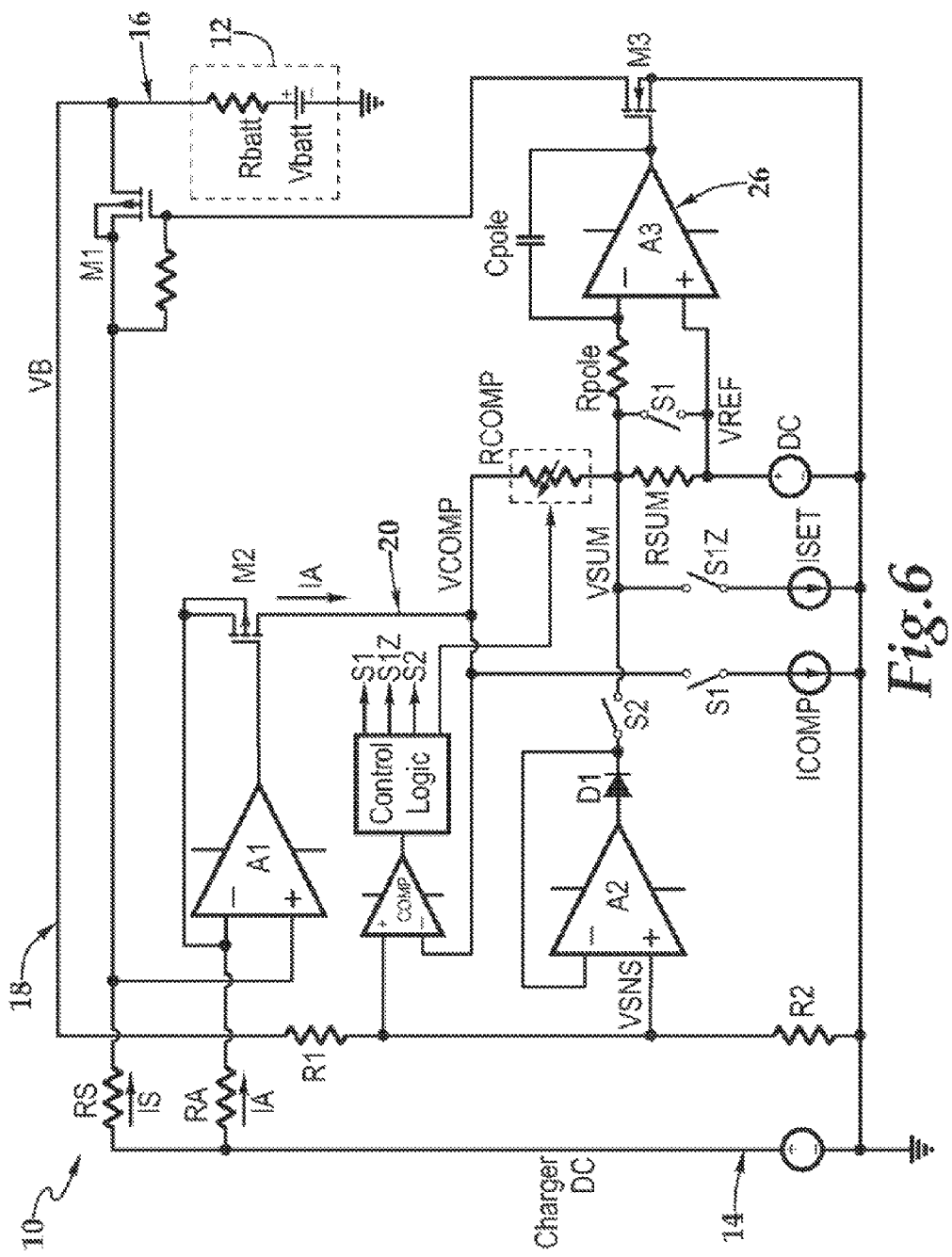
FIG. 6 is a schematic representative drawing of another implementation of the battery charger depicted in FIG. 3.

A further embodiment of the battery recharger 10 is depicted in FIG. 6. If the resolution of RCOMP is not fine enough, to avoid an overshooting of the desired value of RCOMP, a modified circuit as shown in FIG. 6 may be utilized. This circuit design alleviates concerns that if ΔVSNS is set too high, an overcharging and possible battery damage will result. In this circuit design, when switch S1 is closed, a current source ICOMP may be employed to set the value of RCOMP. In this implementation, ICOMP may be larger than ISET, thereby providing a smaller value for RCOMP. VBATT would be charged to value slightly less than the desired value, but when S2 is closed, VBATT would be completely charged to the final value in the constant voltage mode, thereby eliminating the possibility of overcharging the battery.

Figure 7:
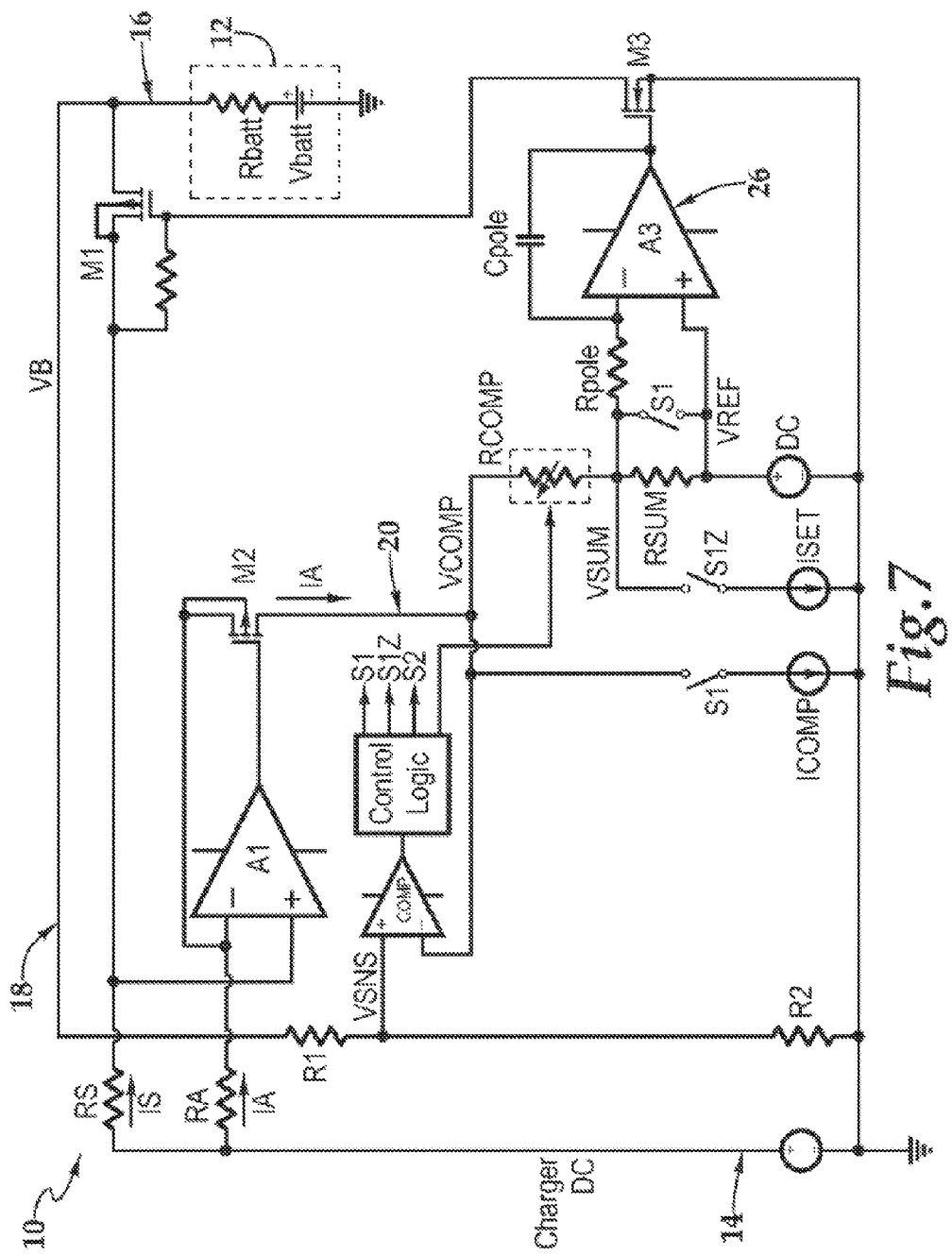
FIG. 7 is a schematic representative drawing of a further implementation of the battery charger depicted in FIG. 3.
Figure 8:
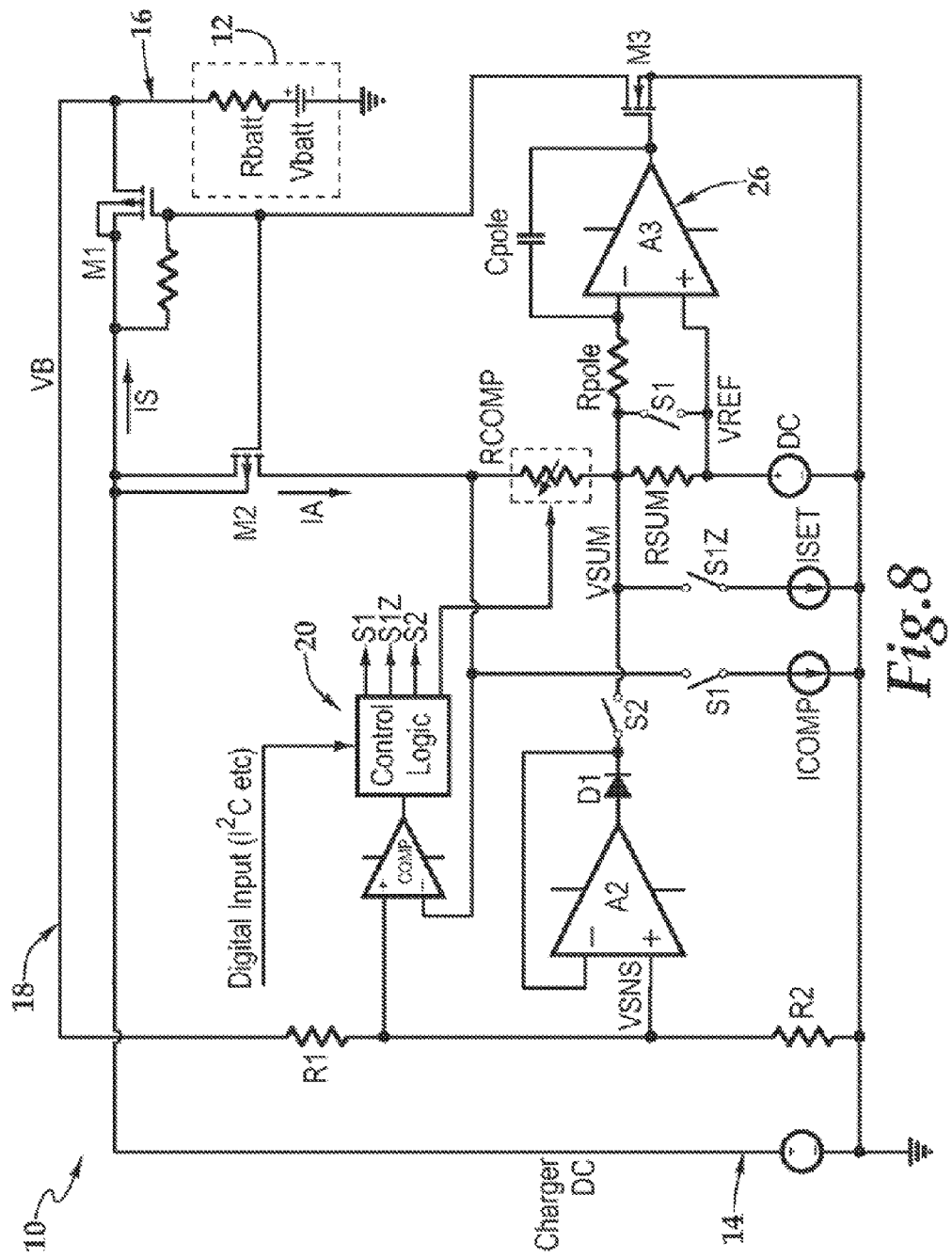
FIG. 8 is a schematic representative drawing of a still further implementation of the battery charger depicted in FIG. 3.

As shown in FIG. 7, the battery charger 10 may further simplified by the elimination of A2, D1, and S2 in instances where the resolution of RCOMP is sufficient to prevent overcharging the battery. This embodiment eliminates the voltage loop circuit and appropriate modifications to the control logic are also implemented. It should be appreciated that further modifications are within the teachings disclosed herein. By way of example, in FIG. 8, a digital interface such as I2C or other communication protocol may be utilized to communicate with the control logic for executing various functions such as the ratio of ICOMP to ISET and/or providing a feedback loop to the system relative to the value of RCOMP.

Figure 9:
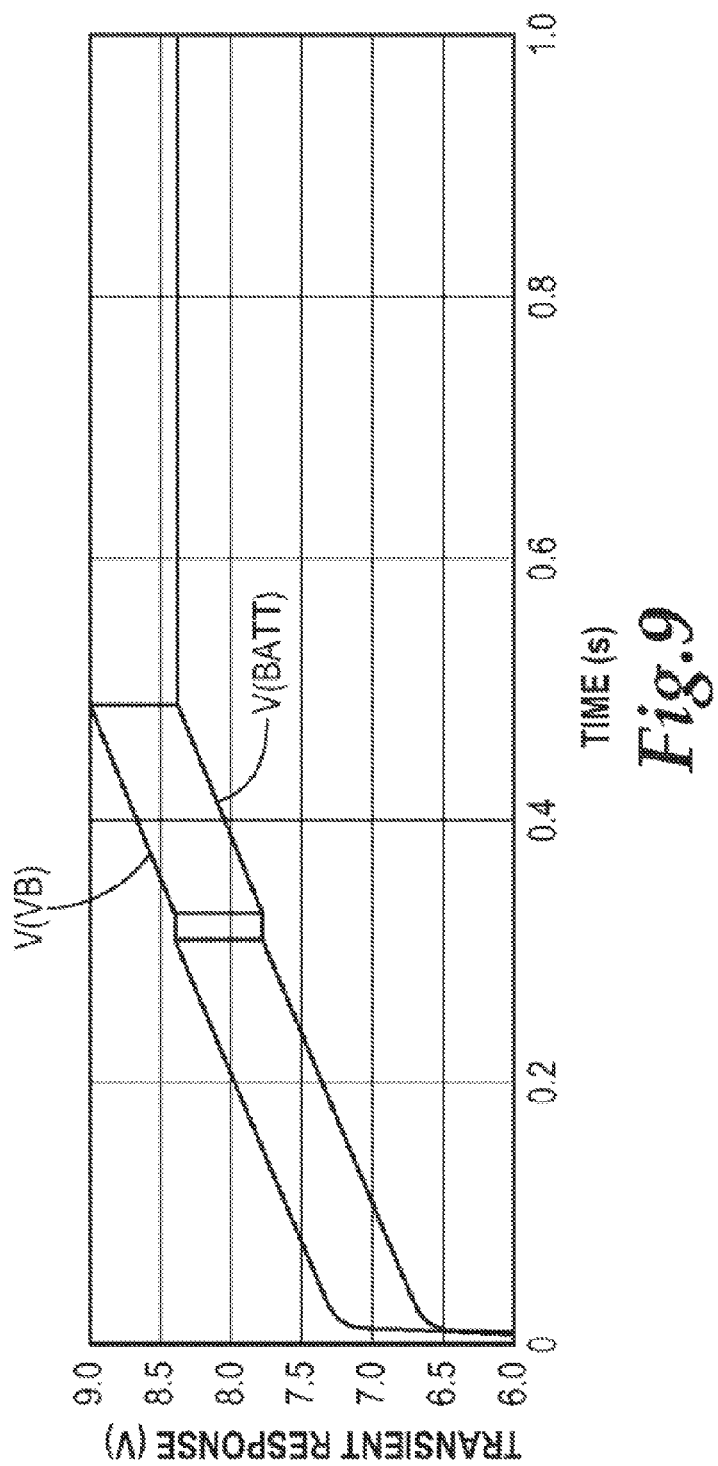
FIGS. 9 through 13 are graphs depicting performance of the battery charger illustrated in FIG. 3.
Figure 10:
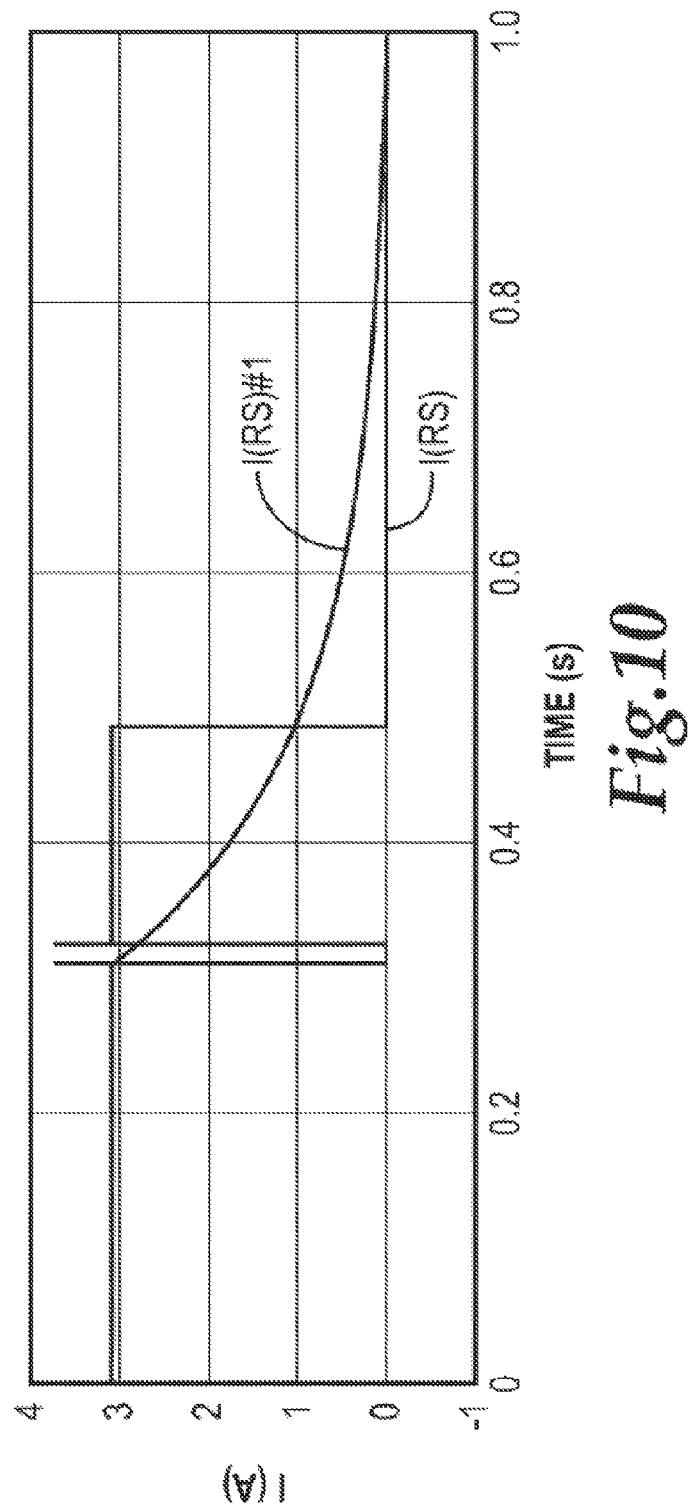
Figure 11:
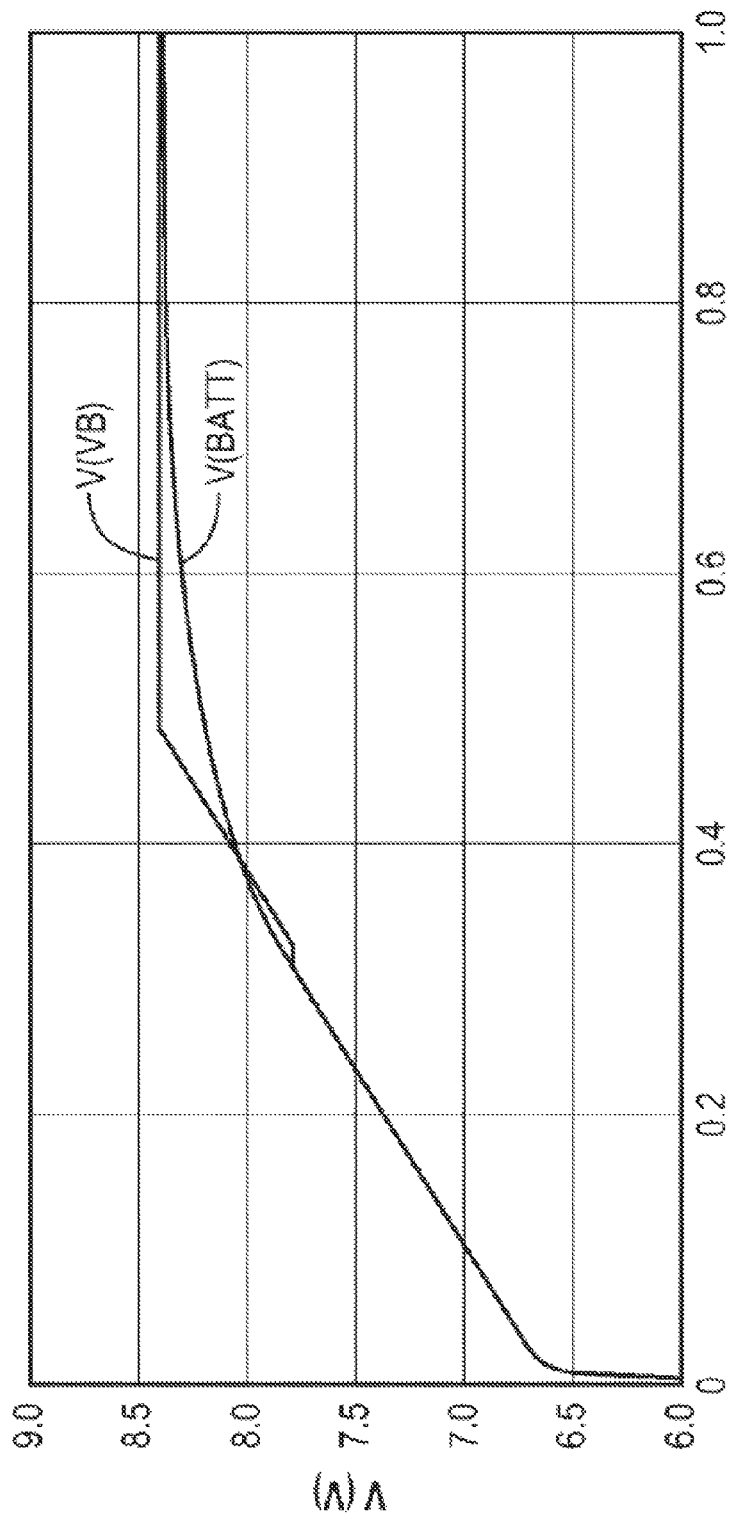

FIGS. 9 through 13 depict graphs showing performance of the battery charger 10. In FIGS. 9-11, more specifically, output simulation is plotted, wherein in FIG. 9, VB and VBATT with desired battery VREF=1.8V, desired output voltage VBATT=8.4V, constant current mode current IS=3 A and RBATT=200 mΩ is depicted. In FIG. 10, charging current, IS, with and without RCOMP is shown. In FIG. 11, VB and VBATT without RCOMP are illustrated.

Figure 12:
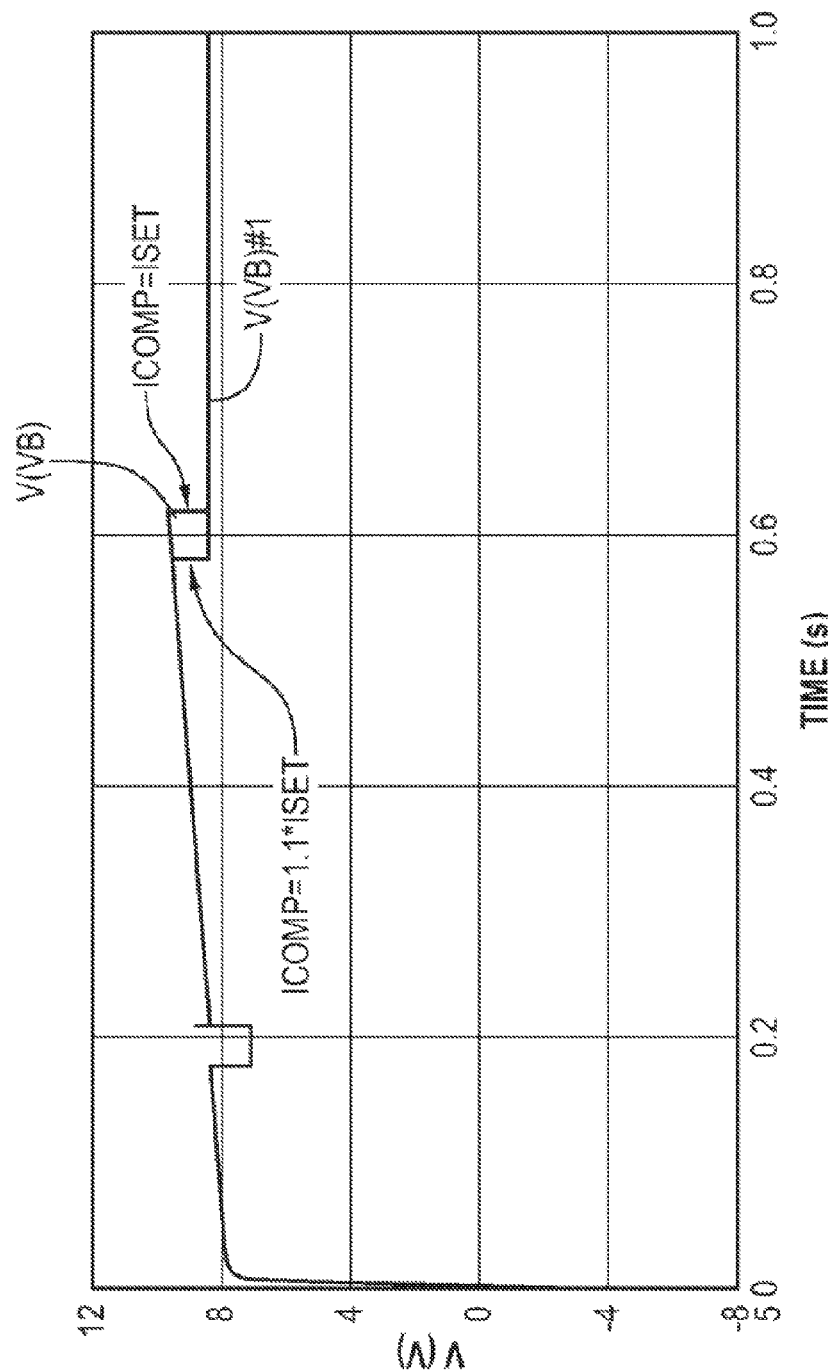
Figure 13:
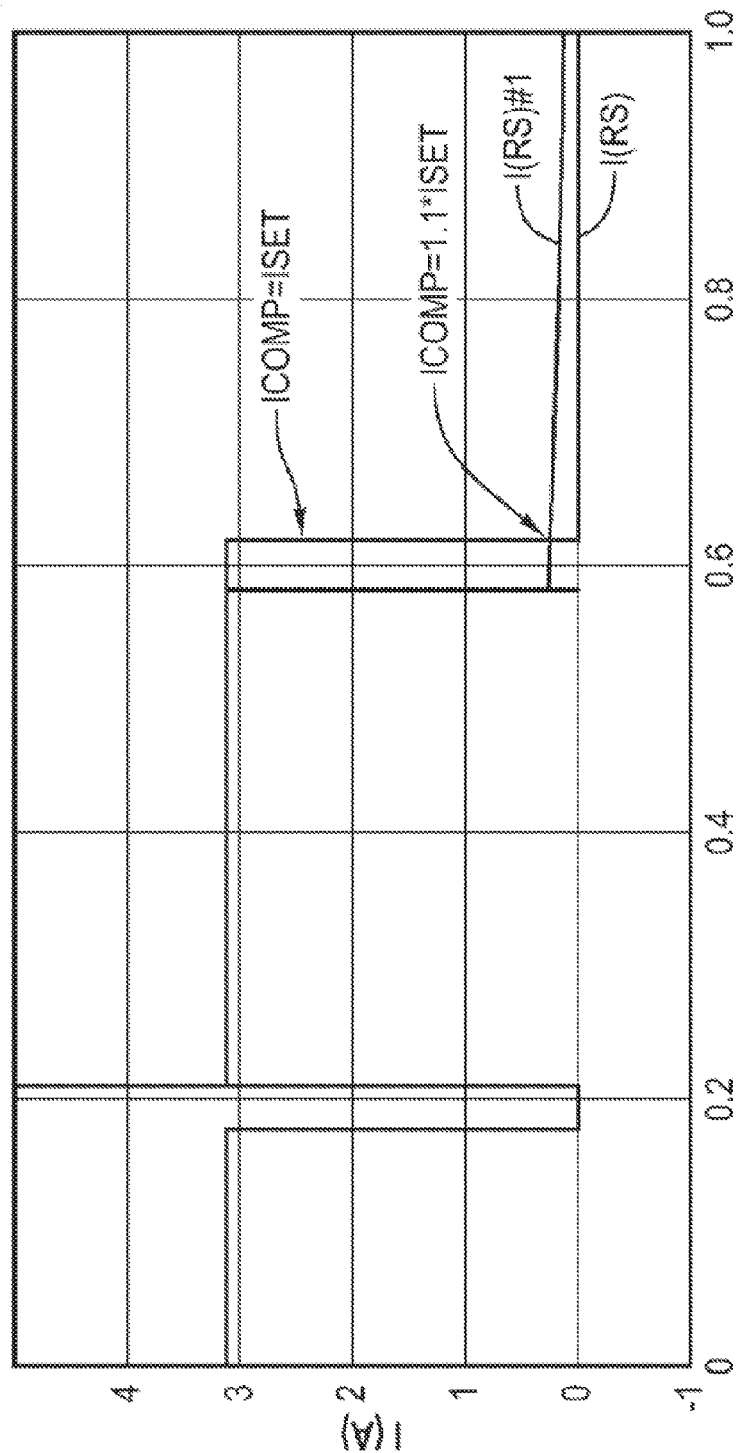
Figure 5B:
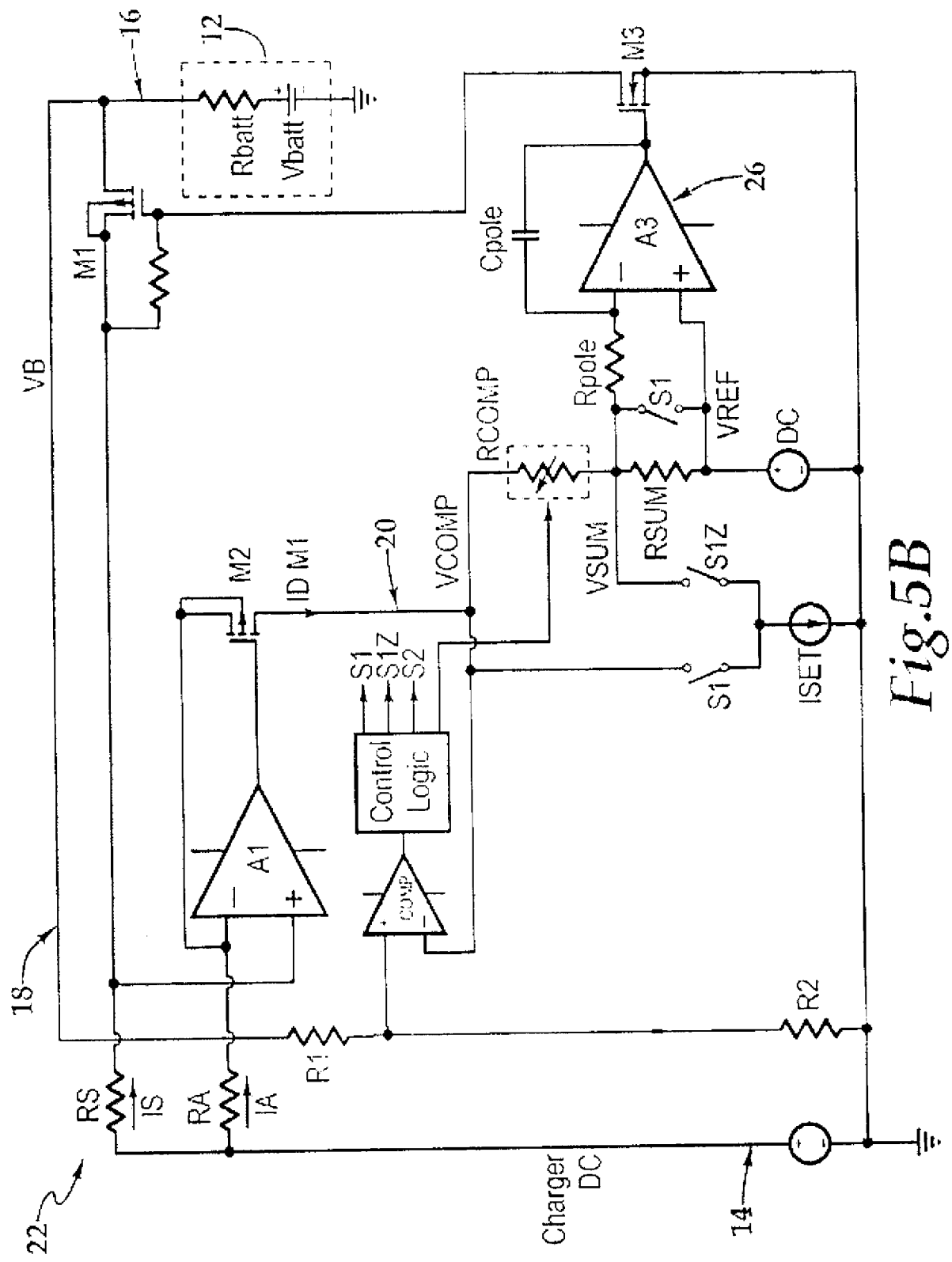

FIGS. 12 and 13 respectively show simulation plots wherein ICOMP is equal to ISET and 110% of ISET. When ICOMP is equal to ISET, the battery charger 10 current falls to 0 at the end of the charge cycle although it is switched to the constant voltage circuit operational mode, wherein there is no current flowing to the battery since the battery is charged to the desired value. With ICOMP set to 110% of ISET, the battery charger switches to the constant voltage mode in order to "saturation charge" the battery. In many instances ICOMP may be set to a value greater than ISET to provide some safety margin to insure that RCOMP was not set to a value greater than RBATT which would result in overcharging the battery. Moreover, a lithium ion battery that received a saturated charge will keep the higher voltage longer than one that was fast-charged and terminated at the voltage threshold without a saturation charge. With a digital interface to the charger, ICOMP may be set to any percent of ISET, as desired.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A battery charger for increasing a charge of a rechargeable battery, the battery charger comprising:
   (a) an input for an electric charging power source configured to supply electrical charging power to the rechargeable battery via an output circuit portion interposed therebetween, the output circuit portion having a predetermined reference voltage associated therewith;
   (b) a transfer function circuit portion configured to sense the voltage of the rechargeable battery as a sensing voltage, wherein a change in the sensing voltage is directly proportional to the internal impedance of the rechargeable battery;
   (c) a control logic circuit portion configured to select between:

(1) a constant current, variable voltage operational mode in which the charging power is defined by a variable resistor set to an initial value;
(2) a constant current, scalable voltage operational mode in which the charging power is defined by an increase in the value of the variable resistor; and
(3) a variable current, constant voltage operational mode; and (d) a compensation circuit portion disposed between the control logic circuit portion and the output circuit portion, the compensation circuit portion configured to generate the change in the sensing voltage thereacross in the constant current, scalable voltage operational mode;

wherein the constant current, variable voltage operational mode is configured to drive the output circuit portion to provide a constant current, variable voltage electrical charging power to the rechargeable battery by setting the variable resistor to an initial value until the sensing voltage is equal to the predetermined reference voltage;

the constant current, scalable voltage operational mode is configured to drive the output circuit portion to provide a constant current, scalable electric charging power to the rechargeable battery in response to the sensing voltage exceeding the predetermined reference voltage, the scalable voltage being scaled to the change in the sensing voltage by increasing the value of the variable resistor; and the variable current, constant voltage operational mode is configured to drive the output circuit portion to provide a variable current, constant voltage electric charging power to the rechargeable battery in response to the sensing voltage exceeding a comparison voltage by stopping the increase of the variable resistor.

2. The battery charger of claim 1 wherein the initial value of the variable resistor is 0Ω.

3. The battery charger of claim 1 wherein the compensation circuit portion further comprises a variable resistor.

4. The battery charger of claim 1 wherein the control logic circuit portion further comprises first and second amplifier circuit portions defining respective current loop circuits and voltage loop circuits.

5. A battery charger for increasing a charge of rechargeable a battery, the battery charger comprising:
(a) an input for an electric charging power source configured to supply electrical charging power to the rechargeable battery via an output circuit portion interposed therebetween, the output circuit portion having a predetermined reference voltage associated therewith;
(b) a transfer function circuit portion configured to sense the voltage of the rechargeable battery as a sensing voltage, wherein a change in the sensing voltage is directly proportional to the internal impedance of the rechargeable battery;
(c) a control logic circuit portion configured to select between:
(1) a constant current, variable voltage operational mode in which the charging power is defined by a variable resistor set to an initial value; and
(2) a constant current, scalable voltage operational mode in which the charging power is defined by an increase in the value of the variable resistor; and (d) a compensation circuit portion disposed between the control logic circuit portion and the output circuit portion, the compensation circuit portion configured to generate the change in the sensing voltage thereacross in the constant current, scalable voltage operational mode;

wherein the constant current, variable voltage operational mode is configured to drive the output circuit portion to provide a constant current, variable voltage electrical charging power to the rechargeable battery by setting the variable resistor to an initial value until the sensing voltage is equal to the predetermined reference voltage; and the constant current, scalable voltage operational mode is configured to drive the output circuit portion to provide a constant current, scalable electric charging power to the rechargeable battery in response to the sensing voltage exceeding the predetermined reference voltage, the scalable voltage being scaled to the change in the sensing voltage by increasing the value of the variable resistor.

6. The battery charger of claim 5 wherein the compensation circuit portion is initially set to 0Ω.

7. The battery charger of claim 5 wherein the compensation circuit portion further comprises the variable resistor.

8. The battery charger of claim 5 wherein the control logic circuit portion further comprises first and second amplifier circuit portions defining respective current loop circuits and voltage loop circuits.

9. A method for charging a rechargeable battery with a battery charger, the method comprising:
(1) providing a constant current to the rechargeable battery to initiate a charge cycle in a constant current mode with a variable resister set to an initial value;
(2) comparing, via a comparator, a sensing voltage to a reference voltage, the sensing voltage measuring the voltage of the rechargeable battery, wherein a change in the sensing voltage is directly proportional to the internal impedance of the rechargeable battery;
(3) stopping the constant current to the rechargeable battery when the sensing voltage is greater than or equal to the reference voltage, the stopping causing the sensing voltage to drop proportionally to the internal impedance of the rechargeable battery, the stopping being the first stopping of the current after the initiation of the charge cycle;
(4) increasing the value of the variable resistor after the stopping in a scalable manner relative to the change in the sensing voltage;
(5) comparing, via the comparator, a comparison voltage to the sensing voltage; and
(6) providing the constant current to the rechargeable battery upon the comparison voltage being less than or equal to the sensing voltage, thereby stopping the increase in value of the variable resistor.

10. The method of claim 9 further comprising:
(7) comparing, via the comparator, the sensing voltage to the reference voltage, the sensing voltage including a second voltage drop across the variable resister, the second drop being proportional to the internal impedance of the rechargeable battery; and
(8) switching to a constant voltage mode when the sensing voltage is greater than or equal to the reference voltage.

* * * * *

UNITED STATES PATENT AND TRADEMARK OFFICE
CERTIFICATE OF CORRECTION

PATENT NO.            : 8,963,485 B2                                    Page 1 of 2
APPLICATION NO.       : 13/653244
DATED                 : February 24, 2015
INVENTOR(S)           : Norman L. Culp It is certified that error appears in the above-identified patent and that said Letters Patent is hereby corrected as shown below:

In the Drawings:

Figure 5B, please replace with the replacement sheet to correct omission of Resistor R2.

Signed and Sealed this
Twenty-first Day of July, 2015

Michelle K. Lee
*Director of the United States Patent and Trademark Office*